United States Patent
Fukurotani (10) Patent No.: US 10,493,502 B2
(45) Date of Patent: Dec. 3, 2019

(54) AIR BLOWING DEVICE

(71) Applicant: SUGINO MACHINE LIMITED, Uozu, Toyama Prefecture (JP)

(72) Inventor: Takuji Fukurotani, Uozu (JP)

(73) Assignee: SUGINO MACHINE LIMITED, Uozu, Toyama Prefecture (JP)

( * ) Notice: Subject to any disclaimer, the term of this patent is extended or adjusted under 35 U.S.C. 154(b) by 72 days.

(21) Appl. No.: 15/787,225

(22) Filed: Oct. 18, 2017

(65) Prior Publication Data

US 2018/0214916 A1  Aug. 2, 2018

(30) Foreign Application Priority Data

Jan. 28, 2017  (JP) .................. 2017-013722

(51) Int. Cl.
  *B08B 5/02* (2006.01)
  *F26B 9/10* (2006.01)
  *F26B 21/00* (2006.01)

(52) U.S. Cl.
  CPC .................. *B08B 5/02* (2013.01); *F26B 9/10* (2013.01); *F26B 21/004* (2013.01)

(58) Field of Classification Search
  CPC ..... A47L 5/14; A47L 5/00; A47L 5/02; A47L 9/08; A47L 5/38; B08B 5/00; B08B 5/02; B08B 9/34; B08B 9/0813; B08B 9/0328; B08B 3/02; B23Q 11/005; F26B 9/10; F26B 21/004
  USPC ............... 15/301, 225, 316.1, 404, 405, 406
  See application file for complete search history.

(56) References Cited

U.S. PATENT DOCUMENTS

| 5,092,523 A | * | 3/1992 | Rucker | ................. B08B 9/0936 239/240 |
| 5,169,069 A | * | 12/1992 | Rucker | ................. B05B 3/0445 239/227 |
| 5,345,649 A | * | 9/1994 | Whitlow | ................... B08B 5/00 15/312.1 |
| 5,474,450 A | * | 12/1995 | Chronister | ......... A61C 17/0208 433/80 |
| 5,507,841 A | * | 4/1996 | Heckman | .................. A47L 5/14 15/301 |

(Continued)

FOREIGN PATENT DOCUMENTS

| JP | 2008-089235 A | 4/2008 |
| JP | 2009-279477 A | 12/2009 |

(Continued)

OTHER PUBLICATIONS

Office Action dated Oct. 8, 2019 in a corresponding Japanese application 2017-013722.

*Primary Examiner* — Orlando E Aviles
*Assistant Examiner* — Robert F Neibaur
(74) *Attorney, Agent, or Firm* — United IP Counselors, LLC (57) ABSTRACT

An air blowing device is numerically controllable. An air blowing device includes a feed base, a nozzle base arranged at a distal end of the feed base, a spindle housing arranged in the nozzle base, a spindle rotatable about a rotation axis, a nozzle block including a first nozzle, and a first fluid channel for feeding dry air to the first nozzle and including a first main pipe, a first annular channel, a first connecting tube, and a first communication channel communicating with the first annular channel and the first nozzle.

14 Claims, 7 Drawing Sheets

(56) References Cited

U.S. PATENT DOCUMENTS

| | | | | |
|---|---|---|---|---|
| 8,814,061 B1* | 8/2014 | Delaney | ................ | B05B 3/0445 |
| | | | | 239/227 |
| 9,364,869 B2* | 6/2016 | Haremaki | ................ | B08B 1/00 |
| 10,105,740 B2* | 10/2018 | Hoffmeyer | ................ | B05B 3/04 |
| 2015/0233378 A1* | 8/2015 | Svoboda | ................ | A47L 5/14 |
| | | | | 15/405 |
| 2015/0251334 A1* | 9/2015 | Coggin | ................ | B28B 11/22 |
| | | | | 15/405 |
| 2016/0023251 A1* | 1/2016 | Mitsue | ................ | B08B 3/024 |
| | | | | 134/134 |

FOREIGN PATENT DOCUMENTS

| | | |
|---|---|---|
| JP | 2011-120976 A | 6/2011 |
| JP | 2012-076215 A | 4/2012 |
| JP | 5432943 B2 | 3/2014 |
| JP | 2016-022461 A | 2/2016 |

\* cited by examiner

AIR BLOWING DEVICE

CROSS-REFERENCE TO RELATED APPLICATIONS

This application claims the benefit of priority to Japanese Patent Application No. 2017-013722, filed on Jan. 28, 2017, the entire contents of which are hereby incorporated by reference.

BACKGROUND

1. Technical Field

The present invention relates to an air blowing device for removing water and other matter on machine parts.

2. Description of the Background

A cleaning device known in the art includes a turret head pivoted in a rotatable manner on a center post fixed to a quill, a cleaning-liquid feed channel for feeding a cleaning liquid to a cleaning tool, a spindle drive for rotating the cleaning tool, a turret drive for revolving the turret head (U.S. Pat. No. 5,432,943, or hereafter Patent Literature 1). In this cleaning device, the cleaning-liquid feed channel extends from a cleaning liquid feeding port outside a cleaning chamber through the inside of the center post to a distal end of the center post, and further from the distal end of the center post to the cleaning tool attached to the turret head.

BRIEF SUMMARY

The cleaning device described in Patent Literature 1 includes the cleaning-liquid feed channel having a small effective cross-sectional area, which cannot be used as a dry air channel to eject dry air from the nozzle. The cleaning device thus cannot be used as an air blowing device. One or more aspects of the present invention are directed to a numerically controllable air blowing device.

In response to the above issue, one aspect of the present invention provides an air blowing device for blowing air toward an object. The device includes:
a feed base configured to be fed in a feeding direction, the feed base being movable in a back-forth direction, an up-down direction, and a right-left direction;
a nozzle base arranged at a distal end of the feed base;
a spindle housing arranged in the nozzle base;
a spindle supported in the spindle housing, and rotatable about a rotation axis orthogonal to the feeding direction;
a nozzle block including a first nozzle, and arranged at a distal end of the spindle; and
a first fluid channel configured to feed dry air to the first nozzle, the first fluid channel including
a first main pipe arranged parallel to the feed base;
a first annular channel being in contact with the spindle inside the spindle housing;
a first connecting tube connecting the first annular channel and the first main pipe, and
a first communication channel communicating with the first annular channel and the first nozzle inside the spindle.

In the air blowing device according to a second aspect of the invention, the first connecting tube is arranged outside the nozzle base and the spindle housing.

The air blowing device according to the above aspects of the present invention is numerically controllable.

DETAILED DESCRIPTION

First Embodiment

An air blowing device 10 according to a first embodiment will now be described with reference to FIGS. 1 to 5.

Figure 1:
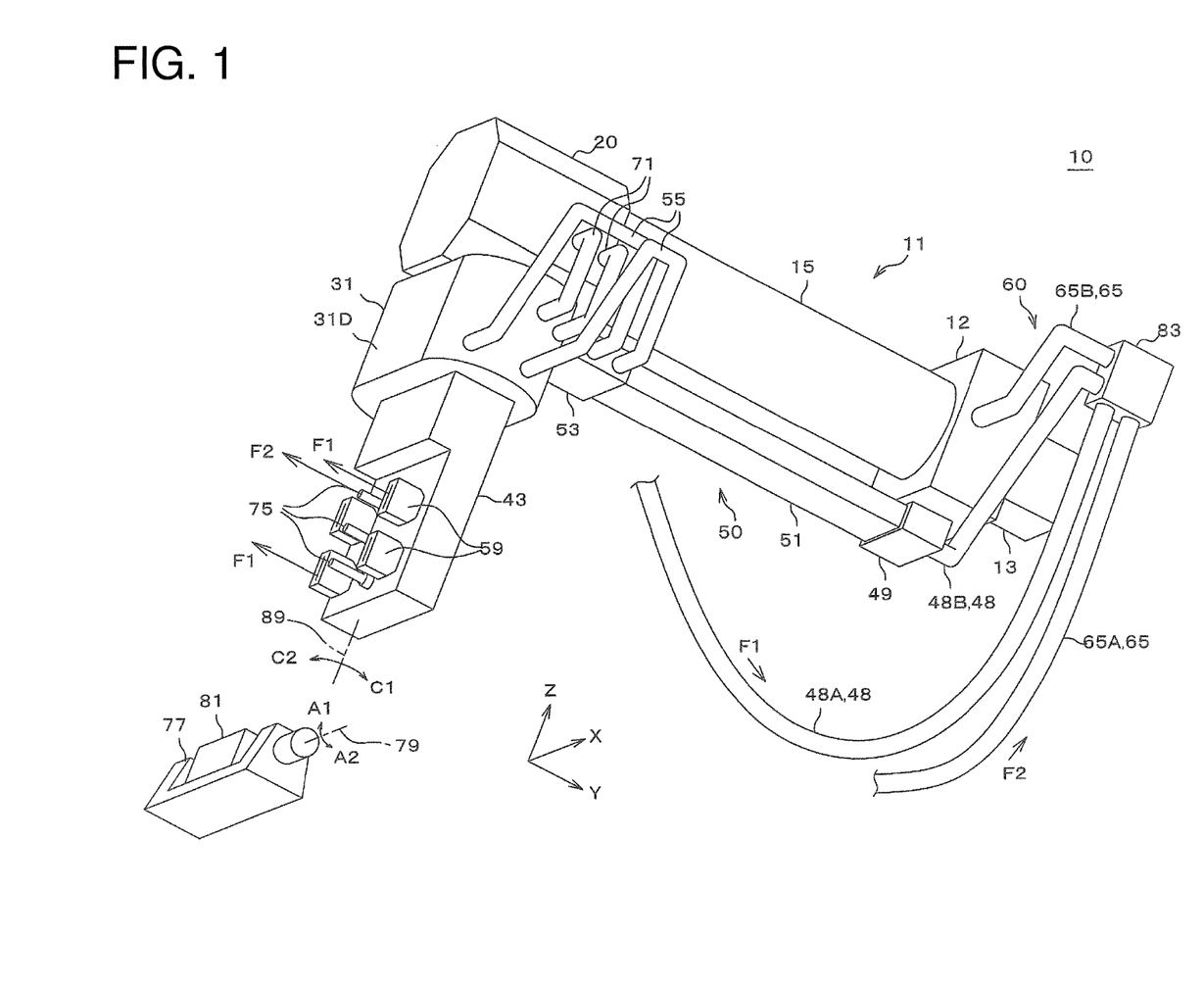
FIG. 1 is a perspective view of an air blowing device according to a first embodiment.

As shown in FIG. 1, the air blowing device 10 includes a table 77 and a feeder 11. The feeder 11 includes a feed base 15, a nozzle base 20, a spindle housing 31 (hereafter, a housing), a motor base 12, a motor (drive) 13, a fluid channel (first fluid channel) 50, a nozzle block 43, slit nozzles (first nozzles) 59, and pipe nozzles (second nozzles) 75. The feeding direction of the feed base 15 is herein Y-direction. The feeder 11 is fed in Y-direction. The housing 31 includes a spindle 33, which is rotatable about a rotation axis 89 (refer to FIG. 2). The rotation axis 89 extends in Z-direction, which is orthogonal to Y-direction. The nozzle block 43 is rotatable about the rotation axis 89 in directions C1 and C2 together with the spindle 33, and can be positioned in these directions.

An air blow object (hereafter, an object) 81 is placed on the table 77. The table 77 may swing on a rotation axis 79 in directions A1 and A2. The rotation axis 79 extends in X-direction, which is orthogonal to the Y and Z axes. The object 81 is, for example, a machine part, such as an automobile block cylinder, an automobile head cylinder, an automobile case transaxle, an automobile housing transaxle, a transaxle valve body, or a hydraulic pressure valve for construction machinery.

The rotation axis 79 may not extend in X-direction, and may extend in Y-direction. The rotation axis 79 may be orthogonal to the rotation axis 89.

The feeder 11 and the table 77 are positioned or rotated as they are controlled by a numerical controller.

Figure 2:
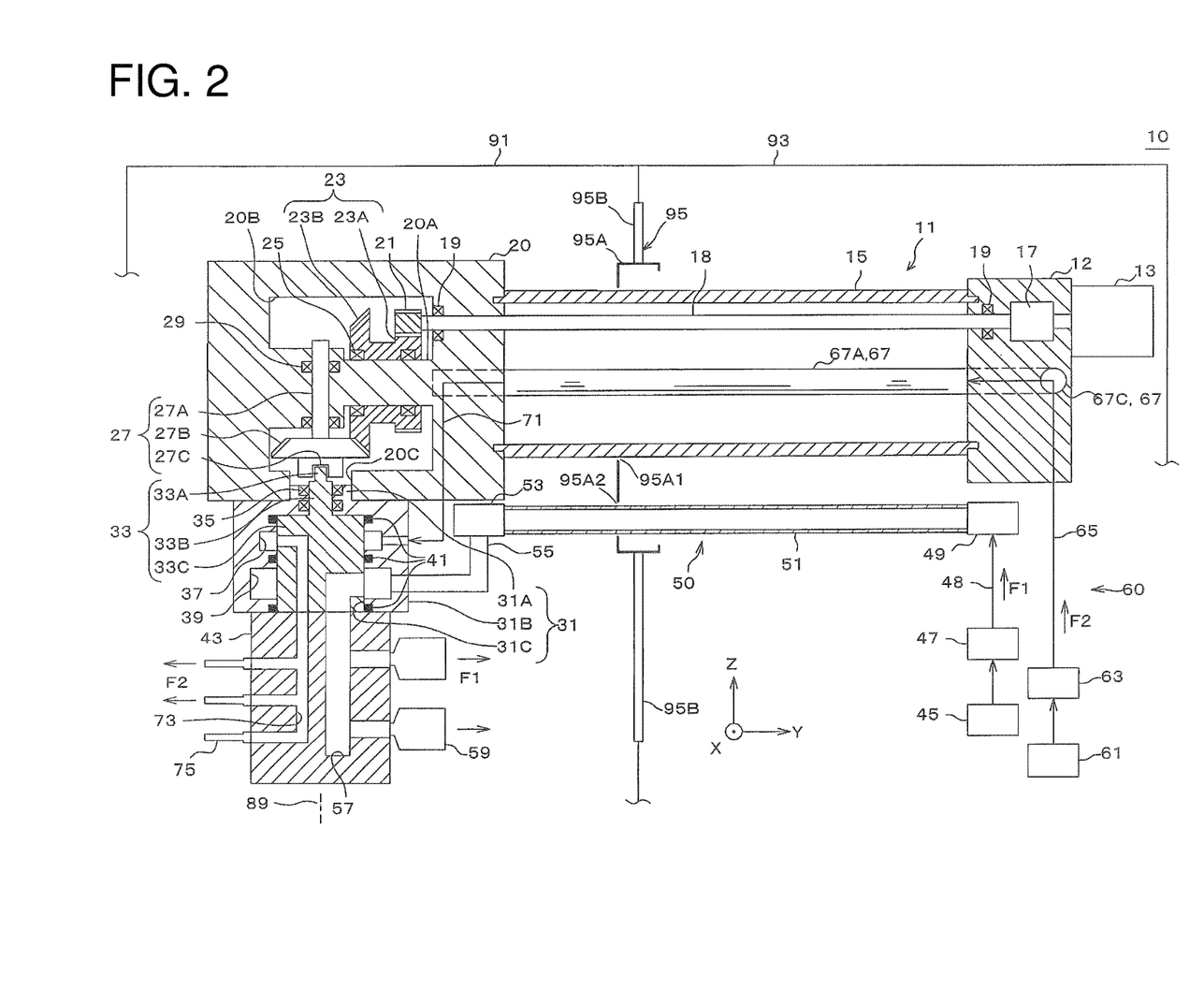
FIG. 2 is a longitudinal sectional view of a feeder for the air blowing device according to the first embodiment.

As shown in FIGS. 1 and 2, the feed base 15 is hollow and cylindrical, and extends horizontally in the back-forth direction (Y-direction). The feed base 15 is mounted on a moving mechanism known in the art (not shown), such as a moving column. The feed base 15 is movable in the back-forth direction (Y-direction), the right-left direction (X-direction), and the up-down direction (Z-direction) relative to the table 77. The feed base 15 is positioned by the numerical controller (not shown). The distal end side of the feed base 15 in Y-direction (in the negative direction of Y axis) may be referred to as the front, and the basal end side of the feed base 15 (in the positive direction of Y axis) may be referred to as the rear. The right side of the distal end of the feed base 15 (in the positive direction of X-direction) may be referred to as the right, and the left side of the distal end of the feed base 15 (in the negative direction of X axis) may be referred to as the left.

The cross-section of the feed base 15 may not be circular, and may be rectangular or diamond.

As shown in FIG. 2, the distal end of the feed base 15 and the table 77 are arranged inside an air blow chamber 91. The basal end of the feed base 15 is arranged in a machine chamber 93, which is outside the air blow chamber 91. The air blow chamber 91 and the machine chamber 93 are separated from each other by a cover 95. The cover 95 includes a movable box 95A and a stretch cover 95B. The stretch cover 95B, which is stretchable, surrounds the movable box 95. The movable box 95A has through holes 95A1 and 95A2. The feed base 15 extends through the through hole 95A1, and a main pipe (first main pipe) 51 extends through the through hole 95A2. The cover 95 is a stretchable cover, such as an accordion cover, a telescopic cover, or a sheet cover.

The air blowing device 10 blows air inside the air blow chamber 91 to prevent water and other matter splashed from the object 81 from splashing outside. In the air blow chamber 91 separated by the cover 95 from the machine chamber 93, water and other matter splashed inside is prevented from sticking on the motor 13 and the moving mechanism (not shown) arranged at the basal end of the feed base 15. This structure can thus reduce damage to the motor 13 or to the moving mechanism.

The nozzle base 20 is fixed to the distal end of the feed base 15. The nozzle base 20 is substantially rectangular. The nozzle base 20 has an internal gear chamber 20B. The gear chamber 20B contains a fixed shaft 20A that extends horizontally in the back-forth direction. The nozzle base 20 has a spindle housing insertion hole 20C on its lower surface.

The housing 31 is hollow and cylindrical, and extends vertically under the nozzle base 20. The housing 31 has an insertion portion 31A with a smaller diameter in its upper portion, and a large-diameter portion 31B with a larger diameter in its lower portion. The insertion portion 31A is fitted into the spindle housing insertion hole 20C. The housing 31 is positioned by its two surfaces, or its top and the side of the insertion portion 31A, and is fixed to the nozzle base 20. The insertion portion 31A contains two rows of bearings 35. The large-diameter portion 31B has an inner cylindrical surface 31C, which is smoothly finished.

As shown in FIG. 1, the housing 31 has a front flat surface 31D, which is a cut surface. The flat surface 31D is nearer the rotation axis 89 than the side surfaces of the housing 31. The flat surface 31D has no first connecting tubes 55 (representing connecting tubes 55A, 55B, 55C, and 55D), and no second connecting tubes 71 (representing connecting tubes 71A, 71B, 71C, and 71D). The flat surface 31D, which is the front surface of the housing 31, shortens the distance between the front-end surface of the feeder 11 and the rotation axis 89 at the height of the housing 31. Thus, when the slit nozzles 59 and the pipe nozzles 75 face forward, the slit nozzles 59 and the pipe nozzles 75 can approach the object 81.

As shown in FIG. 2, the housing 31 contains and supports the cylindrical spindle 33 in a manner rotatable about the rotation axis 89. The spindle 33 has a small-diameter portion 33B in its upper portion (basal end), and a large-diameter portion 33C in its lower portion (distal end). The small-diameter portion 33B is axially supported by the bearings 35. The small-diameter portion 33B has a key-shaped engaging portion 33A at its upper end (basal end of the spindle 33).

The large-diameter portion 33C slides on the cylindrical surface 31C. The nozzle block 43 is fixed to the lower surface of the large-diameter portion 33C (the distal end of the spindle 33). The upper portion of the spindle 33 is axially supported by the bearings 35. The lower portion of the spindle 33 has the large-diameter portion 33C, which is an outer periphery of the spindle 33, supported in a manner slidable on the cylindrical surface 31C, which is an inner periphery of the housing 31. The spindle 33 having both ends supported in a rotatable manner can rotate with little wobbling.

The feed base 15 has the basal end on which the motor base 12 is arranged. The motor base 12 is rectangular. The motor base 12 has one end on which the motor 13 is arranged. The motor 13 may be a servo motor, or a combination of a synchronous motor and an encoder or a resolver. The motor 13 is positioned by a numerical controller.

The motor 13 may be replaced by an angle dividing unit, such as a swivel air cylinder or a roller cam.

The feed base 15 contains a propeller shaft 18, which is arranged above and along the axis (Y-direction) of the feed base 15. The propeller shaft 18 is supported in a rotatable manner on bearings 19, which are arranged in the motor base 12 and the nozzle base 20. The propeller shaft 18 is connected to an output shaft of the motor 13 with a coupling 17. The propeller shaft 18 has a small gear wheel 21 on its distal end.

A compound gear wheel 23 is supported by bearings 25 arranged on the fixed shaft 20A in a manner rotatable about the outer circumference of the fixed shaft 20A. The compound gear wheel 23 includes a large gear wheel 23A and a bevel gear wheel 23B. The large gear wheel 23A meshes with the small gear wheel 21. The bevel gear wheel 23B is fixed to the large gear wheel 23A.

The nozzle base 20 contains a drive shaft 27 supported on the distal end of the fixed shaft 20A in a manner rotatable about the rotation axis 89. The drive shaft 27 includes a shaft 27A, a bevel gear wheel 27B, and a receiver 27C. The shaft 27A is supported coaxially with the spindle 33 by bearings 29. The bevel gear wheel 27B meshes with the bevel gear wheel 23B. The receiver 27C is a rectangular groove that extends horizontally. The receiver 27C is arranged at a lower end (distal end) of the drive shaft. The receiver 27C receives the engaging portion 33A, and is engaged with the engaging portion 33A. The engaging portion 33A is engaged with the receiver 27C to allow the spindle 33 to rotate together with the drive shaft 27.

The rotation of the motor 13 is transmitted to the spindle 33 through the coupling 17, the propeller shaft 18, the small gear wheel 21, the compound gear wheel 23, and the drive shaft 27. The bevel gear wheel 23B and the bevel gear wheel 27B change the direction of rotation from the horizontal direction to the vertical direction.

As shown in FIG. 2, the fluid channel 50 includes a blower (fan) 45, an air supply valve 47, an inflow channel 48, an inflow block 49, the main pipe 51, a manifold 53, the connecting tubes 55 (first connecting tubes), an annular channel 39 (first annular channel), and a communication channel 57 (first communication channel). In the present embodiment, the fluid channel 50 includes four connecting tubes 55.

Dry air F1 discharged from the blower 45 flows through the air supply valve 47, the inflow channel 48, the inflow block 49, the main pipe 51, the manifold 53, the connecting tubes 55, the annular channel 39, and the communication channel 57, and is ejected from the slit nozzles 59.

Although the slit nozzles 59 and the pipe nozzles 75 appear to be opposite to each other in FIG. 2 for convenience of explanation, the slit nozzles 59 and the pipe nozzles 75 are actually arranged to extend in the same direction as shown in FIG. 1.

The blower 45 may be a roots blower. The roots blower has a high blowing pressure. The blowing pressure of the blower 45 may be from 0.02 to 0.1 MPa inclusive, or from 0.04 to 0.08 MPa inclusive. At this pressure, water and other matter on, for example, a casting surface, a hydraulic circuit surface, or a milled surface of a machine part can be removed effectively.

The air supply valve 47 is a two-way valve for blocking or supplying dry air F1.

As shown in FIG. 1, the inflow channel 48 (first inflow channel) includes a hose 48A, a fixing block 83, and an inflow pipe 48B. The movable end of the hose 48A is fixed to the lower surface of the fixing block 83. The fixed end of the hose 48A opposite to the movable end, which faces downward, is fixed to a fixing unit (not shown) of the air blowing device 10. The hose 48A is suspended between the fixing block 83 and the fixing unit. The fixing unit may be arranged adjacent to the distal end of the feed base 15. The hose 48A suspended between the basal end and the distal end of the feed base 15 can shorten the length of the air blowing device 10 in the back-forth direction.

The inflow pipe 48B is a round pipe with a circular cross-section. The inflow pipe 48B connects the fixing block 83 and the inflow block 49. The fixing block 83 may be arranged above the basal end of the feed base 15. The inflow pipe 48B is tilted upward toward the basal end of the feed base 15. The fixing block 83 arranged above the feed base 15 increases the movable range of the hose 48A.

The inflow block 49, the main pipe 51, and the manifold 53 are arranged below the feed base 15.

Figure 3:
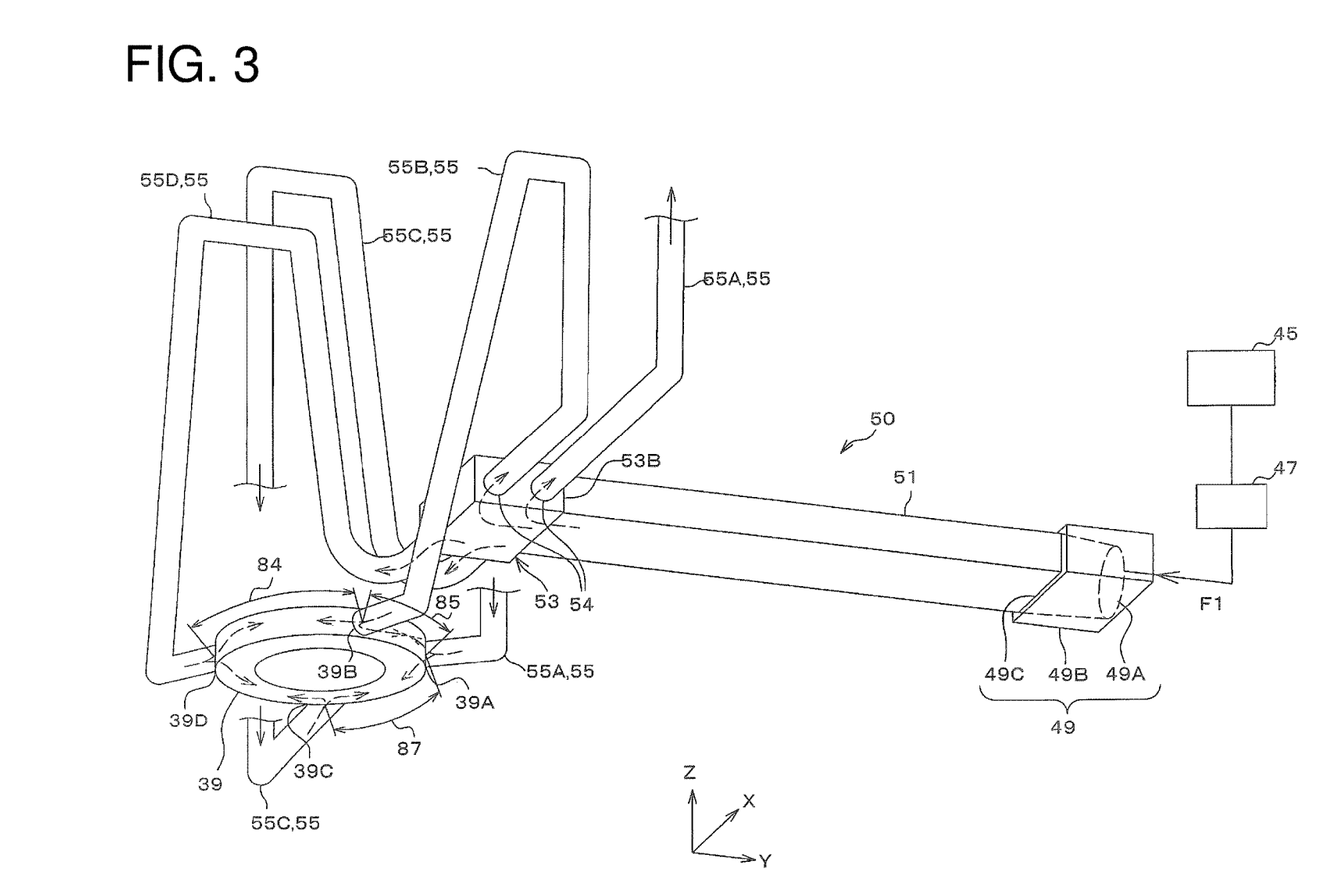
FIG. 3 is a perspective view of a first channel according to the first embodiment.

As shown in FIG. 3, the inflow block 49 is rectangular, and includes a channel 49B, through which the dry air F1 flows. The channel 49B has an inflow port 49A with a circular cross-section. The channel 49B has an outflow port 49C with a rectangular cross-section. The channel 49B may have a cross-sectional shape that changes gradually and continuously from the inflow port 49A to the outflow port 49C. This structure reduces the fluid resistance inside the inflow block 49.

The main pipe 51 is arranged parallel to the feed base 15 below the feed base 15. The main pipe 51 may be a rectangular pipe with a rectangular cross-section. The rectangular main pipe 51 has a lower height than a round pipe with the same cross-sectional area as the rectangular pipe. The main pipe 51 extends through the movable box 95A (refer to FIG. 2). The rectangular main pipe 51 with a smaller height allows the movable box 95A to have a smaller height. The movable box 95A with a smaller height allows the entire cover 95 to have a smaller height. Thus, the entire air blowing device 10 can be downsized.

The manifold 53 is arranged at an end of the main pipe 51 adjacent to the nozzle base 20 (adjacent to the distal end of the feed base 15). The manifold 53 has a single inflow port 53B and a plurality of branch ports 54 (first branch ports). The manifold 53 distributes the dry air F1 flowing in from the main pipe 51 to the plurality of the branch ports 54.

The annular channel 39 is ring-shaped, and has a vertical rectangular cross-section. The annular channel 39 is defined by a circumferential groove formed on the cylindrical surface 31C in a lower portion of the housing 31 and the large-diameter portion 33C of the spindle 33. The annular channel 39 is in contact with the large-diameter portion 33C of the spindle 33. The annular channel 39 has a plurality of connection ports 39A, 39B, 39C, and 39D (first connection ports) arranged substantially at equal intervals in a portion of its periphery in the circumferential direction excluding a portion of the periphery in the distal end direction of the feed base 15. The annular channel 39 may be a circumferential groove formed inward along the outer circumference of the large-diameter portion 33C of the spindle 33, instead of being a circumferential groove on the cylindrical surface 31C.

The connecting tubes 55A, 55B, 55C, and 55D connect the branch ports 54 with the connection ports 39A, 39B, 39C, and 39D. This structure enables the dry air F1 to be supplied uniformly to the annular channel 39. The connecting tubes 55 are round pipes, and are fixed to the manifold 53 and the housing 31 each with a pipe fitting. The connecting tubes 55 are arranged outside the nozzle base 20 and the housing 31. This structure allows the connecting tubes 55 with a large effective cross-sectional area to be designed freely and with a simplified structure.

The connecting tubes 55 may be arranged on the side surfaces of the manifold 53, the housing 31, and the nozzle base 20. The connecting tubes 55 may be arranged in a reverse-U-shape as viewed laterally. This creates a space behind the housing 31. When the slit nozzles 59 and the pipe nozzles 75 face the right or left, or the rear, the slit nozzles 59 and the pipe nozzles 75 can approach the object 81.

The right and left connecting tubes 55 may have the same length as viewed from the distal end of the feed base 15. In other words, the connecting tubes 55B and 55D may have the same length, and the connecting tubes 55A and 55C may have the same length. This structure allows an equal volume of dry air F1 to be supplied both to the left and to the right in the annular channel 39.

The connecting tubes 55B and 55D connected with the connection ports 39B and 39D, which are nearer the distal end of the feed base 15, may be shorter than the connecting tubes 55A and 55C connected with the connection ports 39A and 39C, which are nearer the basal end of the feed base 15. In this case, a circumferential length 84 between the connection ports 39B and 39D is longer than a circumferential length 85 between the connection ports 39A and 39B, and a circumferential length 87 between the connection ports 39A and 39C. The connecting tubes 55B and 55D shorter than the connecting tubes 55A and 55C may allow a larger volume of dry air F1 to flow into the connection ports 39B and 39D than into the connection ports 39A and 39C. This structure allows the dry air F1 to be distributed into the annular channel 39 with the pressure with less circumferential variations, and thus allows a uniform volume of dry air F1 to be ejected from the slit nozzles 59 when the nozzle block 43 is oriented in any circumferential direction.

In another embodiment, the connecting tubes 55B and 55D may have larger diameters than the connecting tubes 55A and 55C.

Although the fluid channel includes the four connecting tubes 55 in the present embodiment, the fluid channel may include any number of connecting tubes 55. For example, the fluid channel may include two to six connecting tubes 55, or three to five connecting tubes 55. Such connecting tubes distribute the dry air F1 substantially equally into the annular channel 39.

Figure 4:
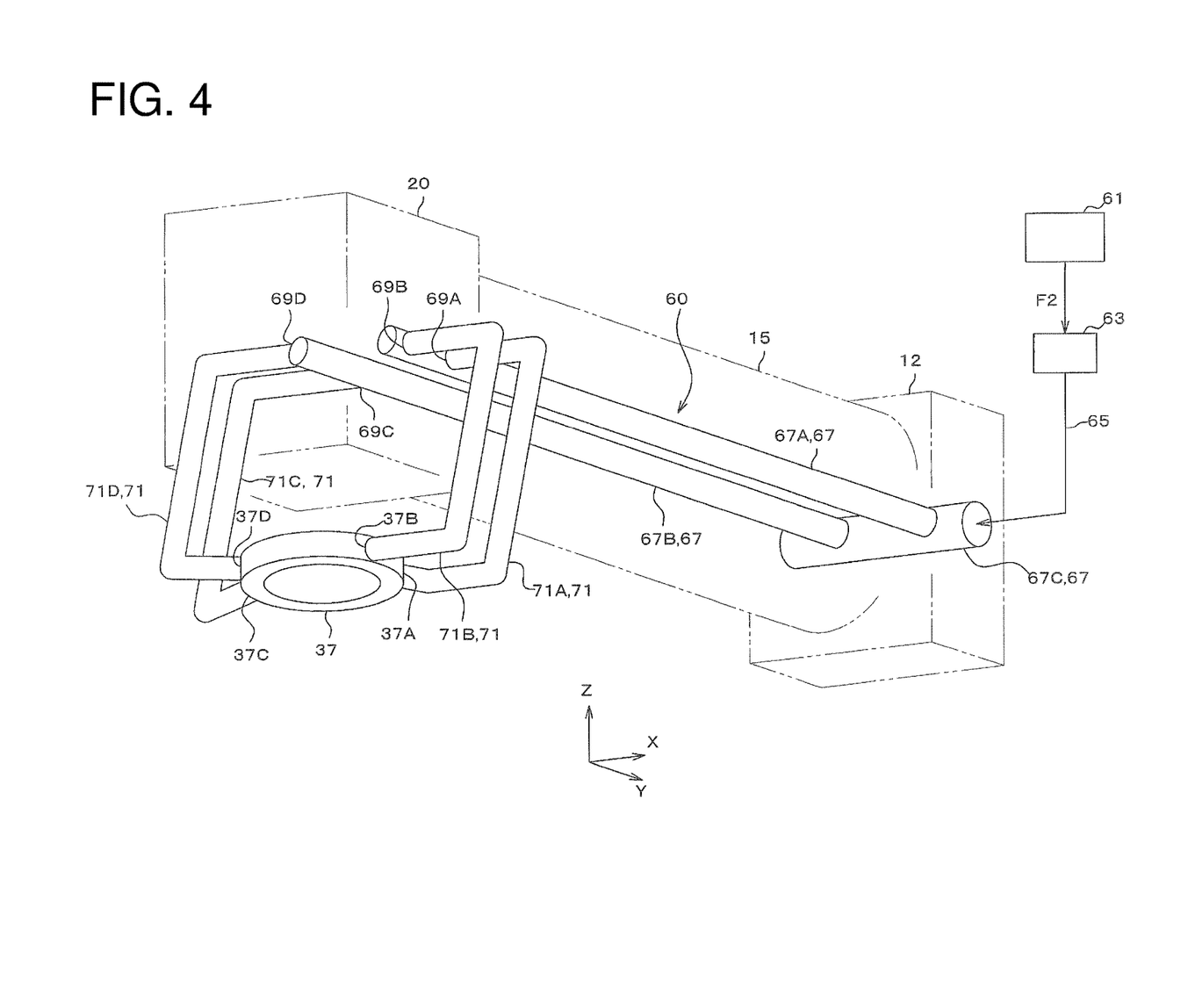
FIG. 4 is a perspective view of a second channel according to the first embodiment.

As shown in FIGS. 1 and 4, a fluid channel 60 (second fluid channel) includes an air compressor 61, a compressed air supply valve 63, an inflow channel 65, a main pipe 67 (second main pipe), a plurality of connecting tubes 71 (second connecting tubes), an annular channel 37 (second annular channel), and a communication channel 73 (second communication channel). The fluid channel 60 according to the present embodiment may include four connecting tubes 71.

Compressed air F2 discharged from the air compressor 61 flows through the compressed air supply valve 63, the inflow channel 65, the main pipe 67, the plurality of connecting tubes 71, the annular channel 37, and the communication channel 73, and is ejected from the pipe nozzles 75.

The pressure of the compressed air F2 may be from 0.1 to 0.6 MPa inclusive. The air F2 at this pressure can blow off any water and other matter accumulating on an oil channel, a water jacket, or in a blind hole of the object 81.

The compressed air supply valve 63 is a two-way valve for blocking or supplying the compressed air F2.

As shown in FIG. 1, the inflow channel 65 (second inflow channel) includes a hose 65A, the fixing block 83, and an inflow pipe 65B. The inflow pipe 65B connects the fixing block 83 and a transverse hole 67C of the main pipe 67 (refer to FIGS. 2 and 4). The hose 65A and the inflow pipe 65B have a smaller cross-sectional area than the hose 48A and the inflow pipe 48B. The other components of the hose 65A and the inflow pipe 65B are similar to the corresponding components of the hose 48A and the inflow pipe 48B, and will not be described in detail.

As shown in FIG. 4, the main pipe 67 has a transverse hole 67C, and galleries 67A and 67B. The transverse hole 67C extends through the motor base 12 in a transverse direction. The galleries 67A and 67B are arranged symmetrical to each other with respect to a YZ plane including the central axis of the feed base 15. The gallery 67A will now be described. The gallery 67A extends in the back-forth direction in the feed base 15. The gallery 67A communicates with the transverse hole 67C on its basal end. Referring also to FIG. 2, the gallery 67A may have its basal end defining an air hole in the motor base 12. The gallery 67A includes a central portion that is a round pipe arranged inside the feed base 15. The gallery 67A may have its distal end defining an air hole in the nozzle base 20. The gallery 67A may have its distal end with branch ports 69A and 69B (second branch ports), which are aligned in Y-direction. The branch ports 69A and 69B are open in the right-side surface of the nozzle base 20.

The main pipe 67 is arranged inside the feed base 15. This structure simplifies and downsizes the feeder 11.

The annular channel 37 is arranged in an upper portion of the housing 31 above the annular channel 39 (refer to FIG. 2). The annular channel 37 has connection ports 37A, 37B, 37C, and 37D (second connection ports) on its periphery in a circumferential direction. Except that the annular channel 37 has a smaller cross-sectional area than the annular channel 39, the annular channel 37 has the same structure as the annular channel 39, and will not be described in detail.

The connecting tubes 71 connect branch ports 69A, 69B, 69C, and 69D to the connection ports 37A, 37B, 37C, and 37D. Except that the connecting tube 71 has a smaller cross-sectional area than the connecting tube 55, the connecting tube 71 has the same structure as the connecting tube 55, and will not be described in detail.

The housing 31 contains packings 41 above the annular channel 37, between the annular channel 37 and the annular channel 39, and below the annular channel 39. The packings 41 seal between the cylindrical surface 31C and the large-diameter portion 33C to prevent dry air F1 and compressed air F2 from leaking from the annular channel 37 and the annular channel 39.

As shown in FIG. 1, the nozzle block 43 is L-shaped as viewed laterally, and is rectangular as viewed from the front. The nozzle block 43 is fixed to the distal end of the spindle 33, and rotates together with the spindle 33. The nozzle block 43 includes the slit nozzles 59 and the pipe nozzles 75 in its lower portion.

The nozzle block 43, the slit nozzles 59, and the pipe nozzles 75 may have a smaller radius of rotation than the spindle housing 31. This allows the nozzle block 43 to approach the object 81. The air blowing is more effective when the distances between the surface of the object 81 and the slit nozzles 59 and the ejection holes 75A of the pipe nozzles 75 are smaller. The above structure thus enables effective air blowing.

Figure 5:
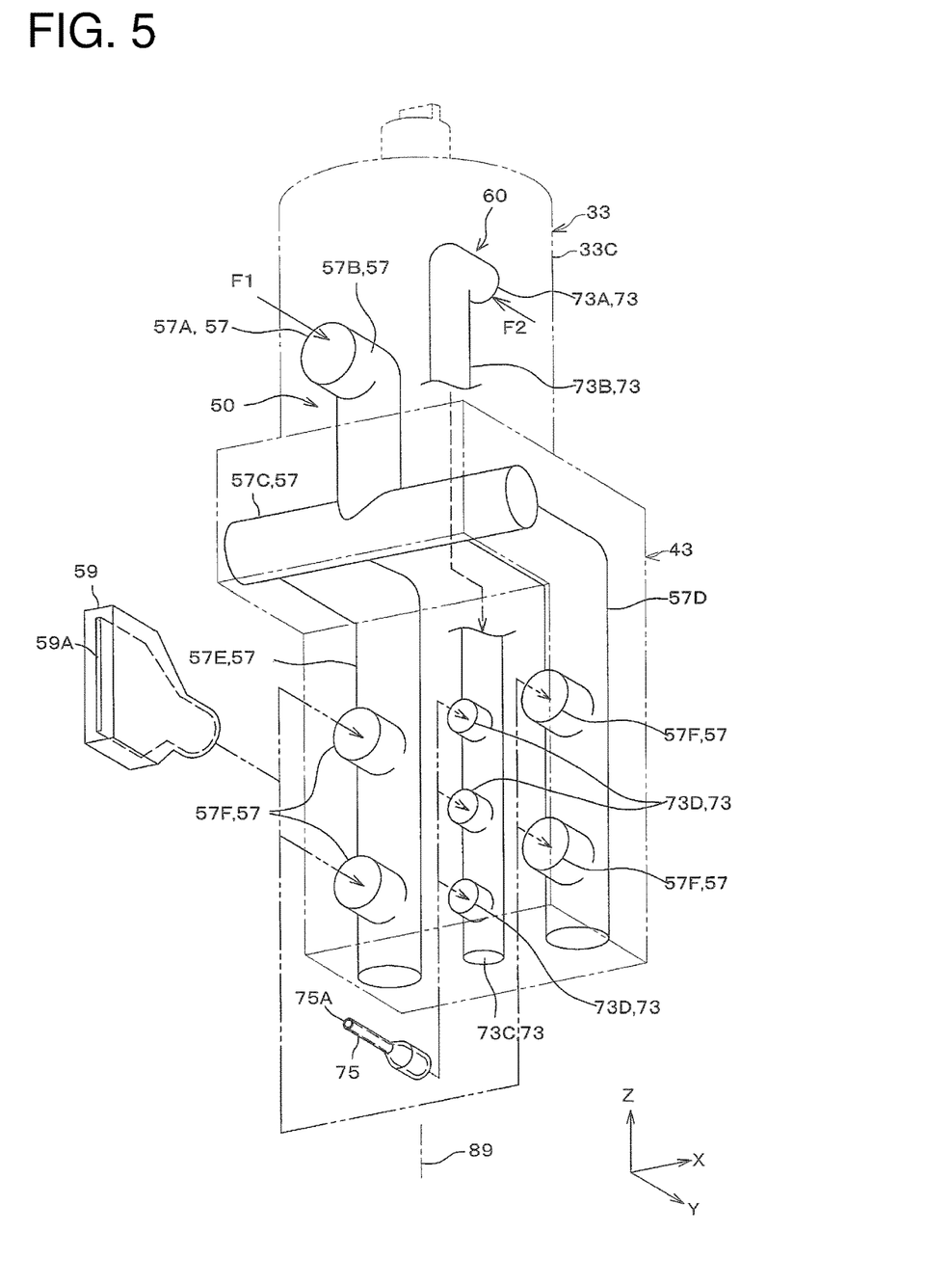
FIG. 5 is a perspective view of a channel in a nozzle block according to the first embodiment.

The channels in the spindle 33 and the nozzle block 43 will now be described with reference to FIG. 5. The communication channel 57 (first communication channel) has an opening 57A, a channel 57B, a branch 57C, a channel 57D, and a channel 57E. The opening 57A faces the large-diameter portion 33C and the annular channel 39 (refer to FIG. 2). With the opening 57A facing the annular channel 39, the communication channel 57 and the annular channel 39 communicate with each other at any position in the rotation direction of the spindle 33. The channel 57B is arranged in the spindle 33, and communicates with the opening 57A. The channel 57B is L-shaped as viewed laterally. The vertical portion of the channel 57B is offset frontward from the rotation axis 89 of the spindle 33. The branch 57C extends in the right-left direction in front and upper portions of the nozzle block 43. The branch 57C communicates with the channel 57B in its middle portion. The effective cross-sectional area of the branch 57C may be about half the effective cross-sectional area of the channel 57B. The branch 57C has, on its right and left ends, the channels 57D and 57E that are arranged symmetrical to each other with respect to a YZ plane including the rotation axis 89. The channel 57D is L-shaped as viewed laterally, and extends along the side surface of the L-shaped nozzle block 43. The effective cross-sectional area of the channel 57D may be about the same as the effective cross-sectional area of the branch 57C. The channel 57D includes, in its vertical portion, a plurality of nozzle attachment holes 57F (two nozzle attachment holes 57F in the present embodiment) that are arranged vertically spaced apart from one another. The structure of the channel 57E is symmetrical to the channel 57D with respect to the YZ plane including the rotation axis 89.

The nozzle attachment holes 57F receive the slit nozzles 59. Each slit nozzle 59 has an ejection hole 59A with a vertically straight narrow slit. Each slit nozzle 59 has a large effective cross-sectional area, and thus has less pressure loss. The slit nozzles 59 are suitable for ejecting dry air F1. The slit nozzles 59 can effectively blow air in a wider area.

Each slit nozzle 59 may have a plurality of ejection holes 59A arranged in the right-left direction of the nozzle. Also, each ejection hole 59A may have many ejection holes that are arranged vertically.

The communication channel 73 (second communication channel) has an opening 73A, a channel 73B, and a channel 73C. The opening 73A faces the large-diameter portion 33C, and the annular channel 37 (refer to FIG. 2). With the opening 73A facing the annular channel 37, the communication channel 73 and the annular channel 37 communicate with each other at any position in the rotation direction of the spindle 33. The channel 73B is arranged in the spindle 33, and communicates with the opening 73A. The channel 73B is L-shaped as viewed laterally. The channel 73B is arranged on the opposite side of the channel 57B with respect to the rotation axis 89. The channel 73B has a smaller effective cross-sectional area than the channel 57B. The channel 73C is L-shaped as viewed laterally, and extends along the nozzle block 43 in the middle in the width direction of the nozzle block 43. The channel 73C has substantially the same effective cross-sectional area as the channel 73B. The channel 73C has, in its vertical portion, nozzle attachment holes 73D that are arranged at equal intervals.

The nozzle attachment holes 73D each receive a pipe nozzle 75 having an ejection hole 75A defining a round pipe. The pipe nozzles 75 have their distal ends aligned substantially with the distal ends of the slit nozzles 59. The pipe nozzles 75 and the slit nozzles 59 have their distal ends either aligned with or protrude from the front surface of the nozzle block 43.

The compressed air F2 ejected from the pipe nozzles 75 flows at a constantly high flow rate for a long distance with little disturbance. The pipe nozzles 75 enable effective air blowing onto the object 81 distant from the pipe nozzles 75. The air blowing device 10 effectively removes water on a narrow portion such as a blind hole or an oil hole.

The nozzle attachment holes 73D and the pipe nozzles 75 may be densely arranged in a lower end portion of the channel 73C. For example, the channel 73C may have, in its lower end portion, a distribution hole extending in a transverse direction and communicating with the channel 73C. The distribution hole may then have a plurality of nozzle attachment holes 73D, which receive pipe nozzles 75. This enables effective air blowing onto an object 81 having a blind hole or an oil hole adjacent to the table 77.

The L-shaped nozzle block 43 contains the slit nozzles 59 and the pipe nozzles 75. This structure downsizes the nozzle block 43, the slit nozzles 59, and the pipe nozzles 75. The L-shaped nozzle block 43 can also have the two communication channels 57 and 73 with a larger effective cross-sectional area.

The advantages of the air blowing device 10 will now be described. Water can be trapped in a blind hole or an oil hole in an object 81, or on a hydraulic circuit surface, or a casting surface of an object 81. The air blowing device 10, which numerically controls the table 77 and the feeder 11, can have the slit nozzles 59 and the pipe nozzles 75 facing such portions in which water is easily trapped, and can blow air intensively toward such portions. The numerical control allows the air blowing device 10 to effectively blow air toward any type of object 81. The air blowing device 10 can be usable for a variety of objects 81 simply by changing the numerical control program.

The numerical control of the air blowing device 10 allows selective uses of the slit nozzles 59 or the pipe nozzles 75 for different portions to effectively remove water and other matter on the object 81.

The table 77 rotates about the rotation axis 79 for positioning. The nozzle block 43 rotates about the rotation axis 89 for positioning. Thus, the air blowing device 10 can blow air toward the entire surface of the object 81.

The feed base 15 is fed in the horizontal direction. The air blowing device 10 can thus be designed to have a lower height.

When the nozzle block 43 rotates to have the slit nozzles 59 and the pipe nozzles 75 facing the rear for blowing air, the feed base 15 and the main pipe 51 extend over the object 81 or the table 77. The main pipe 51, which has a rectangular cross-section, has a smaller height. In this structure, the slit nozzles 59 and the pipe nozzles 75 can reach a lower portion of the object 81. The air blowing device 10 including the main pipe 51 having a rectangular cross-section is usable for the object 81 and the table 77 that may be large.

The blower 45 blows a large amount of warm dry air F1. The blower 45 and the slit nozzles 59 effectively remove water and other matter over a wider area of the object 81. Further, the blower 45 consumes less power than an air compressor that discharges an equivalent amount of air. The air blowing device 10 can thus use more air with an equivalent amount of power consumption.

The fluid channel 50 has a sufficiently large effective cross-sectional area. Thus, the dry air F1 from the blower 45 has less pressure loss. The air blowing device 10 enables effective air blowing.

The fluid channel 60 has a sufficiently large effective cross-sectional area. This structure can also reduce the pressure loss of the compressed air F2 and enables effective air blowing when the nozzle block 43 contains a plurality of pipe nozzles 75.

The above structure may be modified to have the inflow block 49, the main pipe 51, and the manifold 53 arranged above the feed base 15 to extend in the back-forth direction. The main pipe 51 and other components arranged above the feed base 15 can increase the space below the feed base 15, and enables air blowing onto the object 81 and the table 77 that may be large.

Second Embodiment

An air blowing device 100 according to a second embodiment will now be described with reference to FIGS. 6 and 7, focusing on its differences from the air blowing device 10 according to the first embodiment. The air blowing device 100 includes a feeder 111 and a table 77. The feeder 111 includes a spindle housing 131 (hereafter, a housing), a fluid channel 150 (first fluid channel), a fluid channel 160 (second fluid channel), a nozzle block 143, a nozzle pipe 115, and a slit nozzle 159. Except for these components, the air blowing device 100 is the same as the air blowing device 10 according to the first embodiment. The components that are the same as in the first embodiment are given the same reference numerals as those components, and will not be described in detail.

Figure 6:
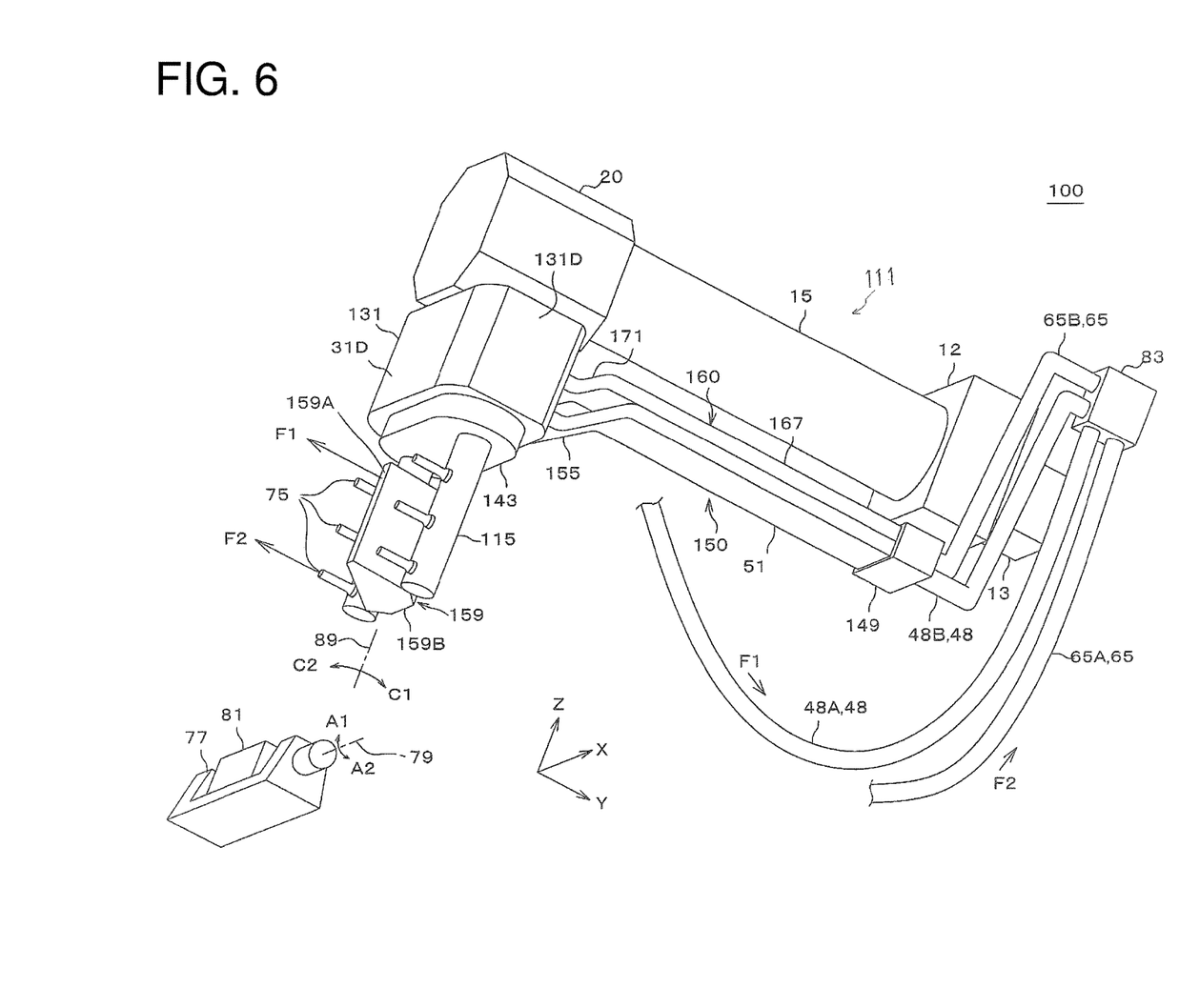
FIG. 6 is a perspective view of an air blowing device according to a second embodiment.

As shown in FIG. 6, the housing 131 has, on its both sides, flat surfaces 131D, which are cut surfaces. The other components are the same as the corresponding components of the housing 31. The flat surfaces 131D allow the slit nozzles 159 and the pipe nozzles 75 to easily approach an object 81 when the slit nozzles 159 and the pipe nozzles 75 face the right or the left.

The nozzle block 143 is disc-shaped, and is integral with the spindle 33. The slit nozzle 159 extends vertically downward along substantially the center of the nozzle block 143. The slit nozzle 159 communicates with an annular channel 39 (first annular channel) through a communication channel (not shown) inside the nozzle block 143. The slit nozzle 159 includes a pipe body 159B, and an ejection hole 159A extending along the axis of the body 159B. This structure allows placement of a large slit nozzle 159, and increases the amount of dry air F1 ejected from the slit nozzle 159. The pipe body 159B and the ejection hole 159A along the axis of the body 159B together produce a jet stream of dry air F1 with little disturbance.

The nozzle pipes 115 extend in the vertical direction on both sides (right and left) of the slit nozzle 159. The two nozzle pipes 115 each communicate with the annular channel 37 through a communication channel (not shown) inside the nozzle block 143. Each nozzle pipe 115 includes a plurality of the pipe nozzles 75, which are arranged substantially at equal intervals. This structure allows the compressed air F2 to be distributed equally into the pipe nozzle 75 to create a jet stream of the compressed air F2 with little disturbance.

Figure 7:
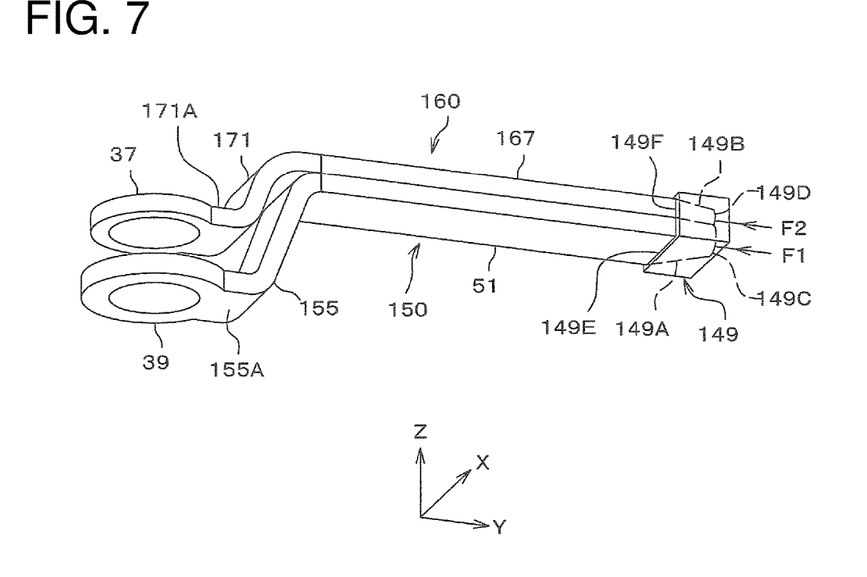
FIG. 7 is a perspective view of first and second channels according to the second embodiment.

As shown in FIG. 7, the fluid channel 150 includes a channel 149A, a main pipe 51, and a connecting tube 155 (first connecting tube).

The inflow block 149 includes a channel 149A for the fluid channel 150, and a channel 149B for the fluid channel 160. The channel 149A connects an inflow port 149C and an outflow port 149E. The inflow ports 149C has a circular cross-section. The outflow port 149E has a rectangular cross-section. The channel 149A may have a gradually changing cross-section.

The connecting tube 155 is a single duct, and has substantially the same cross-section as the main pipe 51. The connecting tube 155 connects the single rectangular connection port 155A arranged at the rear of the annular channel 39 with the front end of the main pipe 51. The connecting tube 155 is arranged outside the housing 131 and the feed base 15. The connecting tube 155 may be integral with the main pipe 51.

The fluid channel 160 includes a channel 149B, a main pipe 167 (second main pipe), and a connecting tube 171 (second connecting tube).

The channel 149B is arranged above the channel 149A to connect the inflow port 149D and the outflow port 149F. The channel 149B has a smaller effective cross-sectional area than the channel 149A. Except for these components, the channel 149B is the same as the channel 149A, and will not be described in detail.

The main pipe 167 is a rectangular pipe with a rectangular cross-section, and is arranged above the main pipe 51. The main pipe 167 has substantially the same cross-sectional area as the channel 149B. The main pipe 167 has the same width as the main pipe 51, and has a smaller height than the main pipe 51. The main pipe 167 and the main pipe 51 may be integral.

The connecting tube 171 is a single duct, and has substantially the same cross-section as the main pipe 167. The connecting tube 171 connects the single rectangular connection port 171A arranged at the rear of the annular channel 37 with the front edge of the main pipe 167. The connecting tube 171 and the main pipe 167 may be integral.

In the present embodiment, although the fluid channel 160 is arranged above the fluid channel 150, the fluid channel 150 may be arranged above the fluid channel 160. In this case, the annular channel 39 is arranged above the annular channel 37.

The air blowing device 100 according to the present embodiment includes no components on the right and left side surfaces of the housing 131. This allows the slit nozzles 159 and the pipe nozzles 75 facing sideways to easily approach the object 81.

The present invention is not limited to the above-described embodiments, and various modifications are possible without departing from the gist of the present invention, and all technical matters included in the technical concept described in the claims are encompassed by the present invention. While specific embodiments have been described, those skilled in the art may practice various alternatives, modifications, alterations, or improvements from the disclosure described herein, and all such variations fall within the scope of the invention defined by the appended claims.

For example, the air blowing device 10 may further include slit nozzles 159, which are fixed around the table 77 to face the object 81. The air blowing device 100 may include the connecting tube 155 and the main pipe 51 using a single flexible duct, and the connecting tube 171 and the main pipe 167 using another flexible duct.

Also, the fluid channel 50 in the air blowing device 10 according to the first embodiment may be replaced by the fluid channel 150 according to the second embodiment.

REFERENCE SIGNS LIST 10, 100 air blowing device
13 motor (drive)
15 feed base
18 propeller shaft
20 nozzle base
27 drive shaft
27C receiver
31, 131 spindle housing
33 spindle
33A engaging portion
37 annular channel (second annular channel)
37A, 37B, 37C, 37D connection port (second connection port)
39 annular channel (first annular channel)
39A, 39B, 39C, 39D connection port (first connection port)
43, 143 nozzle block
45 blower (fan)
50, 150 fluid channel (first fluid channel)
51 main pipe (first main pipe)
54 branch port (first branch port)
55, 55A, 55B, 55C, 55D, 155 connecting tube (first connecting tube)
57 communication channel (first communication channel)
59, 159 slit nozzle (first nozzle)
60 fluid channel (second fluid channel)
67 main pipe (second main pipe)
69A, 69B, 69C, 69D branch port (second branch port)
71, 71A, 71B, 71C, 71D connecting tube (second connecting tube)
73 communication channel (second communication channel)
75 pipe nozzle (second nozzle)

What is claimed is:

1. An air blowing device for blowing air toward an object, the device comprising:
a feed base configured to be fed in a feeding direction, the feed base being movable in a back-forth direction, an up-down direction, and a right-left direction;
a nozzle base arranged at a distal end of the feed base;
a spindle housing arranged in the nozzle base;
a spindle supported in the spindle housing, and rotatable about a rotation axis orthogonal to the feeding direction;
a nozzle block, including a first nozzle and a second nozzle, arranged at a distal end of the spindle;
a blower configured to discharge dry air;
an air compressor configured to discharge compressed air;
a first fluid channel configured to feed dry air discharged from the blower to the first nozzle, the first fluid channel including
a first main pipe arranged parallel to the feed base;
a first annular channel being in contact with the spindle inside the spindle housing;
a first connecting tube connecting the first annular channel and the first main pipe, and a first communication channel communicating with the first annular channel and the first nozzle inside the spindle; and a second fluid channel configured to feed compressed air discharged from the air compressor to the second nozzle, the second fluid channel including
a second main pipe arranged along the feed base,
a second annular channel being in contact with the spindle inside the spindle housing,
a second connecting tube connecting the second annular channel and the second main pipe, and
a second communication channel communicating with the second annular channel and the second nozzle inside the spindle.

2. The air blowing device according to claim 1, wherein the first connecting tube is arranged outside the nozzle base and the spindle housing.

3. The air blowing device according to claim 2, wherein the first fluid channel further includes
a plurality of first branch ports arranged at an end of the first main pipe adjacent to the nozzle base, and communicating with the first main pipe, and
a plurality of first connection ports arranged in a circumferential direction of the first annular channel, and
the first connecting tube includes a plurality of first connecting tubes that allow the plurality of first connection ports and the plurality of first branch ports to communicate with one another.

4. The air blowing device according to claim 3, wherein the plurality of first connection ports are arranged in a portion of a periphery of the first annular channel excluding a portion of the periphery in a distal end direction of the feed base.

5. The air blowing device according to claim 1, wherein the first fluid channel further includes
a plurality of first branch ports arranged at an end of the first main pipe adjacent to the nozzle base, and communicating with the first main pipe, and
a plurality of first connection ports arranged in a circumferential direction of the first annular channel, and
the first connecting tube includes a plurality of first connecting tubes that allow the plurality of first connection ports and the plurality of first branch ports to communicate with one another.

6. The air blowing device according to claim 5, wherein the plurality of first connection ports are arranged in a portion of a periphery of the first annular channel excluding a portion of the periphery in a distal end direction of the feed base.

7. The air blowing device according to claim 5, further comprising:
a drive shaft configured to rotate about the rotation axis inside the nozzle base;
an engaging portion arranged at a basal end of the spindle;
a receiver arranged at a distal end of the drive shaft, and configured to receive and be engaged with the engaging portion to allow the spindle and the drive shaft to rotate together;
a drive arranged at a basal end of the feed base, and configured to drive the drive shaft; and
a propeller shaft arranged inside the feed base, and configured to transmit an output power of the drive to the drive shaft.

8. The air blowing device according to claim 1, wherein the second connecting tube is arranged outside the nozzle base and the spindle housing.

9. The air blowing device according to claim 1, wherein the second fluid channel further includes
a plurality of second branch ports arranged at an end of the second main pipe adjacent to the nozzle base and communicating with the second main pipe, and
a plurality of second connection ports arranged in a circumferential direction of the second annular channel, and
the second connecting tube includes a plurality of second connecting tubes that allow the plurality of second connection ports and the plurality of second branch ports to communicate with one another.

10. The air blowing device according to claim 9, wherein the plurality of second connection ports are arranged in a portion of a periphery of the second annular channel excluding a portion of the periphery in a distal end direction of the feed base.

11. The air blowing device according to claim 1, further comprising:
a drive shaft configured to rotate about the rotation axis inside the nozzle base;
an engaging portion arranged at a basal end of the spindle;
a receiver arranged at a distal end of the drive shaft, and configured to receive and be engaged with the engaging portion to allow the spindle and the drive shaft to rotate together;
a drive arranged at a basal end of the feed base, and configured to drive the drive shaft; and
a propeller shaft arranged inside the feed base, and configured to transmit an output power of the drive to the drive shaft.

12. The air blowing device according to claim 1, wherein the first nozzle is a slit nozzle.

13. The air blowing device according to claim 1, wherein the second nozzle is a pipe nozzle.

14. The air blowing device according to claim 1, wherein the spindle has a basal end axially supported on the spindle housing, and the spindle has a distal end having an outer periphery configured to slide on an inner periphery of the spindle housing.

* * * * *